US012076736B2

(12) United States Patent
Ma et al.

(10) Patent No.: US 12,076,736 B2
(45) Date of Patent: Sep. 3, 2024

(54) FOAM DISCHARGE CONTAINER

(71) Applicant: Kao Corporation, Tokyo (JP)

(72) Inventors: Shiqing Ma, Shanghai (CN); Yadong Xia, Shanghai (CN); Chanjia He, Shanghai (CN); Songjie Zhang, Shanghai (CN); Beibei Zhu, Shanghai (CN)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 17/997,048

(22) PCT Filed: Apr. 6, 2021

(86) PCT No.: PCT/IB2021/052825

§ 371 (c)(1),
(2) Date: Oct. 25, 2022

(87) PCT Pub. No.: WO2021/220081

PCT Pub. Date: Nov. 4, 2021

(65) Prior Publication Data

US 2023/0166277 A1 Jun. 1, 2023

(30) Foreign Application Priority Data

Apr. 27, 2020 (CN) ......................... 202010341859.4
Mar. 10, 2021 (CN) ......................... 202110260691.9

(51) Int. Cl.
*B05B 7/00* (2006.01)
*B05B 11/10* (2023.01)
*A47K 5/14* (2006.01)

(52) U.S. Cl.
CPC ........ *B05B 11/1087* (2023.01); *B05B 7/0062* (2013.01); *A47K 5/14* (2013.01); *B05B 11/1012* (2023.01)

(58) Field of Classification Search
CPC ............... B05B 7/0062; B05B 11/1012; B05B 11/1047; B05B 7/0037; B05B 11/1087; A47K 5/14
See application file for complete search history.

(56) References Cited

U.S. PATENT DOCUMENTS 5,271,530 A 12/1993 Uehira et al.
5,570,819 A 11/1996 Uehira et al.
(Continued)

FOREIGN PATENT DOCUMENTS

CN 107107078 A 8/2017
JP 5-40159 U 5/1993
(Continued)

OTHER PUBLICATIONS

International Search Report & Written Opinion mailed on Jun. 22, 2021 in PCT/IB2021/052825 filed on Apr. 6, 2021 (6 pages).
(Continued)

*Primary Examiner* — Donnell A Long
(74) *Attorney, Agent, or Firm* — Oblon, McClelland, Maier & Neustadt, L.L.P.

(57) ABSTRACT

A foam discharge container, including a container main body for accommodating a liquid composition and a foam discharge device which mixes the liquid composition with air and discharges it in a foam form. The foam discharge device has a plurality of porous bodies through which the liquid composition passes when the liquid composition is discharged, the plurality of porous bodies include a tip side porous body arranged in a vicinity of a discharge port of the foam discharge device, and the tip side porous body is composed of polyethylene terephthalate.

21 Claims, 7 Drawing Sheets

(56) References Cited

U.S. PATENT DOCUMENTS

| | | | | | |
|---|---|---|---|---|---|
| 5,605,259 | A * | 2/1997 | Clawson | B65D 83/752 222/402.1 | |
| 6,082,586 | A * | 7/2000 | Banks | B05B 11/1097 222/145.5 | |
| 2006/0229227 | A1 | 10/2006 | Goldman et al. | | |
| 2007/0040048 | A1 * | 2/2007 | Poizot | B05B 11/1023 222/464.2 | |
| 2009/0255961 | A1 * | 10/2009 | Greer, Jr. | E04F 13/02 222/402.1 | |
| 2009/0317270 | A1 * | 12/2009 | Reynolds | A47K 5/16 417/410.1 | |
| 2012/0228332 | A1 * | 9/2012 | Huang | A45D 24/26 222/190 | |
| 2015/0034680 | A1 * | 2/2015 | Babikian | B05B 11/0097 222/321.9 | |

FOREIGN PATENT DOCUMENTS

| | | | | | |
|---|---|---|---|---|---|
| JP | 07-215352 | A | | 8/1995 | |
| JP | 07215353 | A | * | 8/1995 | B05B 11/043 |
| JP | 3163646 | U | | 10/2010 | |
| JP | 2017-190141 | A | | 10/2017 | |
| JP | 2018-83781 | A | | 5/2018 | |
| TW | 202005718 | A | | 2/2020 | |
| WO | WO 92/08657 | | | 5/1992 | |

OTHER PUBLICATIONS

Extended European Search Report issued in European Patent Application No. 21796184.6 on Apr. 23, 2024.

* cited by examiner

FOAM DISCHARGE CONTAINER

CROSS REFERENCE TO RELATED APPLICATIONS

This application is a National Stage entry under 35 U.S.C. § 371 of PCT/IB2021/052825, filed on Apr. 6, 2021, and claims priority to Chinese Patent Application Nos. 202010341859.4, filed on Apr. 27, 2020 and 202110260691.9, filed on Mar. 10, 2021. The entire contents of each are incorporated herein by reference.

TECHNICAL FIELD

The invention relates to a foam discharge container.

BACKGROUND OF THE INVENTION

Conventionally, foam discharge containers for discharging liquid compositions such as hand soaps, facial cleansers, and body washes in a foam form have been widely used. Specifically, the composition accommodated in the foam discharge container is mixed with gas such as air to form foam, and the generated foam is discharged from the discharge port through the internal flow path of the foam discharge container.

Here, a porous body through which the foam passes is usually formed in the flow path of the foam, and the foam becomes fine by passing through the porous body. Generally, synthetic fibers such as nylon, polyethylene, and polypropylene are used as the porous body.

In this regard, a foam discharge container capable of obtaining more uniform and fine foam is sought. For example, Patent Document 1 discloses a foam ejection device in which two sheets of porous bodies with different mesh sizes are provided at the ejection port side, and a liquid agent in a foam form passes through the porous bodies, thereby ejecting a more uniform liquid agent in a foam form.

However, in the foam ejection device of Patent Document 1, if the device is left to stand for a long time or used intermittently for a long time after the foam is discharged, the foam remaining on the porous body at the discharge port side will dry and solidify, clogging the pores of the porous body, causing the pump to press poorly, making it difficult to discharge the liquid agent, and failing to stably obtain a uniform and fine foam.

In addition, in the foam ejection device of Patent Document 1, there is a problem that the pressing force when the foam ejection device is pressed to eject the foam is large.

PRIOR ART LITERATURE

Patent Literature

Patent Document 1: Japanese Utility Model Patent No. 3163646

SUMMARY OF THE INVENTION

The present invention has been made in view of the above-mentioned problems of the prior art. One object of the present invention is to provide a foam discharge container capable of maintaining a uniform and fine foam quality and preventing clogging due to drying and solidification of a liquid agent on a porous body. Moreover, another object of the present invention is to provide a foam discharge container which can reduce the pressing force at the time of pressing the foam discharge device.

In order to achieve the above-mentioned one object, the present inventors have conducted intensive studies, and as a result found that the above-mentioned problems can be solved by arranging a porous body made of a specific material in the vicinity of the discharge port.

Furthermore, the inventors also found that by using the liquid composition with specific composition in the above-mentioned foam discharge container, further and more excellent effects can be obtained.

In addition, in order to achieve the above-mentioned another object, the inventors have conducted in-depth research, and as a result found that the above problems can be solved by setting the corner which defines the connection flow path that communicates with the discharge port of the foam discharge device and communicates with the pump core flow path as a curve corner rather than a right angle.

Specifically, one aspect of the present invention relates to the following ① and ②.

① A foam discharge container, wherein the foam discharge container comprises a container main body for accommodating a liquid composition, and a foam discharge device for mixing the liquid composition contained in the container main body with air and discharging it in a foam form, the foam discharge device has a plurality of porous bodies through which the liquid composition passes when discharging the liquid composition, the plurality of porous bodies comprise a tip side porous body arranged in the vicinity of the discharge port of the foam discharge device, the tip side porous body is composed of polyethylene terephthalate (PET).

② A foam discharge container, wherein comprising:

the foam discharge device of the foam discharge container described in the above 0; and a container main body containing a liquid composition, the liquid composition contains alcohols with IOB value of 0.55~5.0 as component (A).

In addition, another aspect of the present invention relates to the following ③ and ④.

③ A foam discharge container, wherein the foam discharge container comprises a container main body for accommodating a liquid composition; and a foam discharge device for mixing the liquid composition contained in the container main body with air and discharging it in a foam form, the foam discharge device comprises an arc-shaped curve corner defining a connection flow path that communicates with the discharge port of the foam discharge device and communicates with the pump core flow path, the curve corner includes an inside curve corner and an outside curve corner.

④ A foam discharge container, wherein comprising:

the foam discharge device of the foam discharge container described in the above ③; and a container main body containing a liquid composition, the liquid composition contains alcohols with IOB value of 0.55~5.0 as component (A).

EXPLANATION OF SYMBOLS

Figure 1:
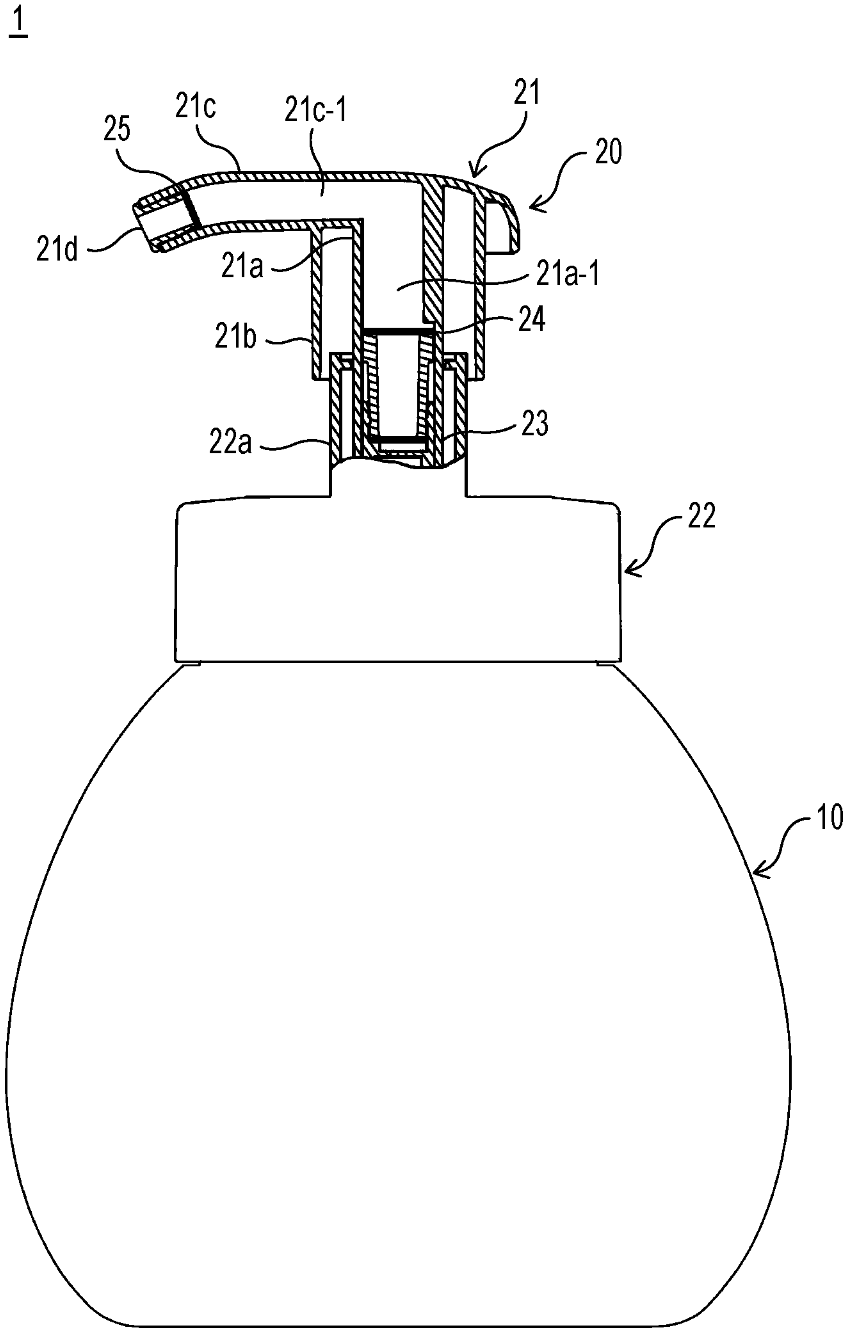
FIG. 1 is a side partial cross-sectional view showing a foam discharge container according to the first embodiment of the present invention.

1 . . . foam discharge container
10 . . . container main body
20, 20A, 20B . . . foam discharge device
21 . . . discharge head
21*a* . . . first cylindrical portion
21*b* . . . second cylindrical portion
21*c* . . . nozzle portion
21*d* . . . discharge port
22 . . . cap portion
22*a* . . . tubular portion
23 . . . first porous body
24 . . . second porous body
25 . . . third porous body (tip side porous body)
26*a* . . . air chamber
26*b* . . . piston for air
27*a* . . . liquid chamber
27*b* . . . piston for liquid
28 . . . linkage lever
29 . . . mixing chamber
25*a*, 25*b* . . . filamentous portion
25*c* . . . pore portion
30 . . . pump core flow path
31 . . . connection flow path
32 . . . curve corner
32*a* . . . inside curve corner
32*b* . . . outside curve corner
P1 . . . starting point of inside curve corner
P2 . . . end point of inside curve corner
P3 . . . starting point of outside curve corner
P4 . . . end point of outside curve corner

DETAILED DESCRIPTION OF THE INVENTION

Hereinafter, embodiments of the present invention are described in detail with reference to the accompanying drawings. In addition, in the specification and drawings, the same symbols are assigned to the structures that substantially have the same functions, and overlapping descriptions are omitted.

First Embodiment

1. The overall structure of the foam discharge container

Figure 2:
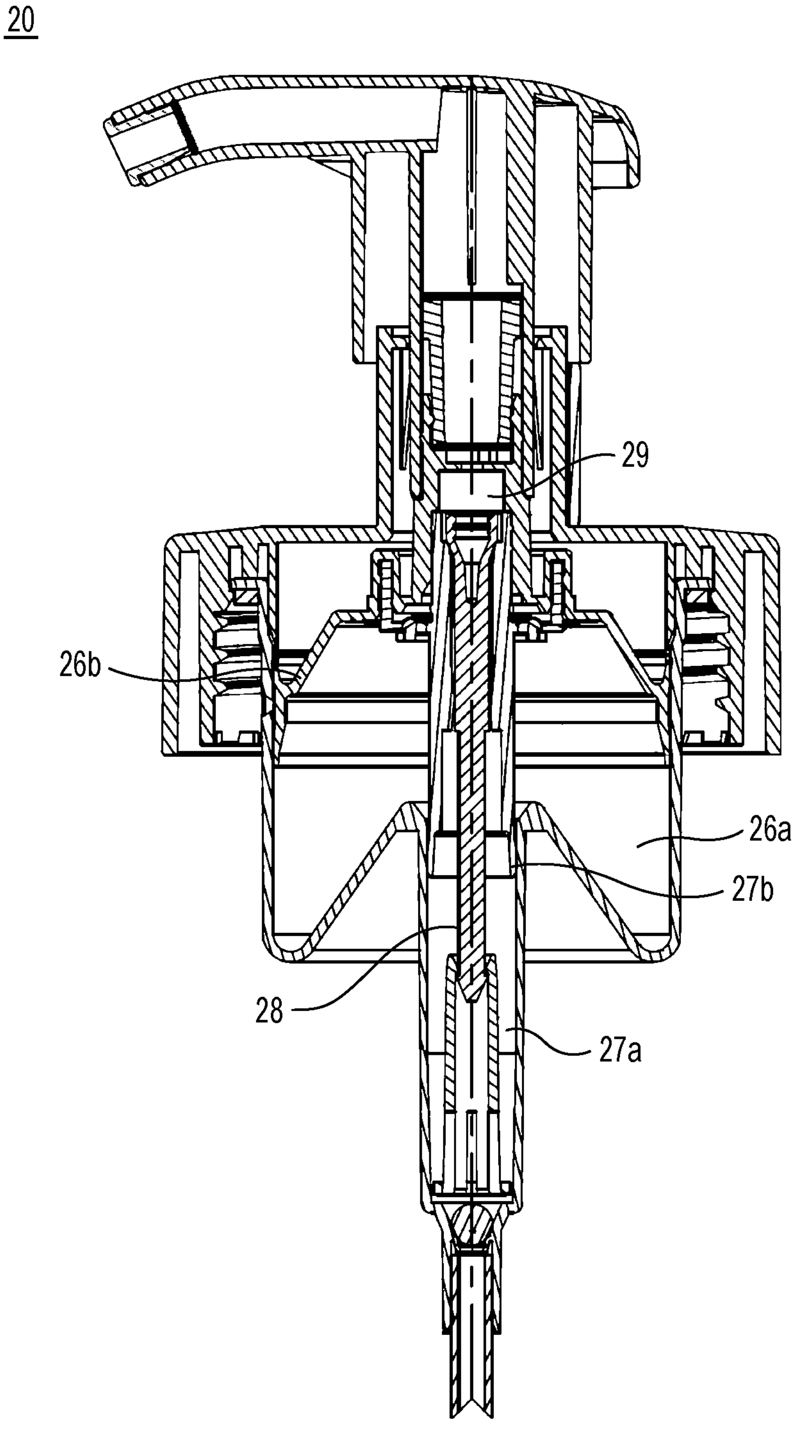
FIG. 2 is a cross-sectional view showing the foam discharge device according to the first embodiment of the present invention.

First, the structure of the foam discharge container 1 of this embodiment is demonstrated based on FIG. 1 and FIG. 2. FIG. 1 is a side partial cross-sectional view showing the foam discharge container 1 of the present embodiment. FIG. 2 is a cross-sectional view showing the foam discharge device 20 according to the embodiment of the present invention.

In addition, in this specification, in order to understand easily, the direction toward the foam discharge device 20 from the container main body 10 mentioned later is called an upper direction. Here, since the user can take various postures when using the foam discharge container 1, the direction from the container main body 10 toward the foam discharge device 20 does not necessarily mean a vertically upward direction.

As shown in FIG. 1, the foam discharge container 1 has a container main body 10 containing a liquid composition, and a foam discharge device 20 for discharging the liquid composition contained in the container main body 10 in a foam form. Specifically, the liquid composition contained in the container main body 10 is mixed with air to generate foam, and the foam thus generated passes through the internal flow paths 21*a*-1 and 21*c*-1 of the foam discharge device 20, and is discharged from the discharge port 21*d* formed in the discharge head 21.

The container main body 10 is a hollow-shaped member having a mouth at the upper end, and the foam discharge device 20 is arranged at the mouth. The above-mentioned liquid composition is accommodated in the inside of the container main body 10. The container main body 10 is composed of resin, for example.

The foam discharge device 20 discharges the liquid composition accommodated in the inside of the container main body 10 in a foam form. The foam discharge device 20 is composed of resin, for example.

Specifically, as shown in FIGS. 1 and 2, the foam discharge device 20 includes a discharge head 21 and a cap portion 22. The cap portion 22 is screwed to the mouth portion of the container main body 10, so that the foam discharge device 20 is detachably attached to the container main body 10. In addition, the foam discharge device 20 includes a pump mechanism that forms foam by mixing the liquid composition contained in the container main body 10 with air, and sends the foam to the discharge head 21.

Generally known pump mechanisms can be used as the pump mechanism. For example, as shown in FIG. 2, the pump mechanism comprises a piston for liquid 27*b* that can slide up and down in the liquid chamber 27*a*, an piston for air 26*b* that can slide up and down in the air chamber 26*a*, and a linkage lever 28 that is arranged inside the mouth of the container main body 10 and that can move up and down in conjunction with the piston for liquid 27*b* and the piston for air 26*b*, and a spring (not shown) that pushes the linkage lever 28 upward.

A mixing chamber 29 for mixing the liquid composition supplied from the piston for liquid 27*b* and the air supplied from the air chamber 26*a* is formed in the lower part of the discharge head 21. When the discharge head 21 is pressed, the piston for liquid 27*b* and the piston for air 26*b* are pushed down together with the linkage lever 28, and the liquid composition contained in the container main body 10 is supplied to the mixing chamber 29 by the piston for liquid 27*b*, and air is supplied to the mixing chamber 29 by the air chamber 26*a*. Thus, in the mixing chamber 29, the liquid composition is mixed with air, thereby forming foam.

The discharge head 21 comprises first cylindrical portion 21*a* that is inserted into the inner side of tubular portion 22 protruding upward from a radially central side of the cap portion 22 and extends in the up-down direction, second cylindrical portion 21*b* that covers the outer peripheral portion of tubular portion 22*a* of cap portion 22 and extends in the up-down direction, and nozzle portion 21*c* extends in the radial direction of first cylindrical portion 21*a* from the upper part of first cylindrical portion 21*a*.

The internal flow path 21*a*-1 of the first cylindrical portion 21*a* communicates with the internal flow path 21*c*-1 of the nozzle portion 21*c*, and discharge port 21*d* is formed at the tip of the nozzle portion 21*c*. In addition, the above-mentioned mixing chamber 29 is formed in the lower portion of the internal flow path 21*a*-1 of the first cylindrical portion 21*a*, and first porous body 23 and second porous body 24 are provided on the downstream (i.e., upper side) of the mixing chamber 29 of the internal flow path 21*a*-1 of the first cylindrical portion 21*a* in order from below. Thereby, after the foam formed in the mixing chamber 29 becomes fine by the first porous body 23 and the second porous body 24, it is sent to the internal flow path 21*c*-1 of nozzle portion 21*c* through the internal flow path 21*a*-1 of the first cylindrical portion 21*a*. Then, after the foam becomes finer by the third porous body 25 set in the vicinity of the discharge port 21*d*, the foam is discharged from the discharge port 21*d*. The first to third porous bodies 23 to 25 are film-like or plate-like members in which a plurality of through-holes are formed. Here, the third porous body 25 is a tip side porous body arranged in the vicinity of the discharge port 21*d*, and the first porous body 23 and the second porous body 24 are inner side porous bodies arranged on the upstream side (upstream side of the flow direction of foam) of the third porous body 25. Details of these porous bodies will be described later. In addition, in FIG. 1, the internal flow path is a bent shape, but it is not limited to this, and the internal flow path may be a linear shape (for example, the shape extended upwards).

2. Porous Body

Figure 3:
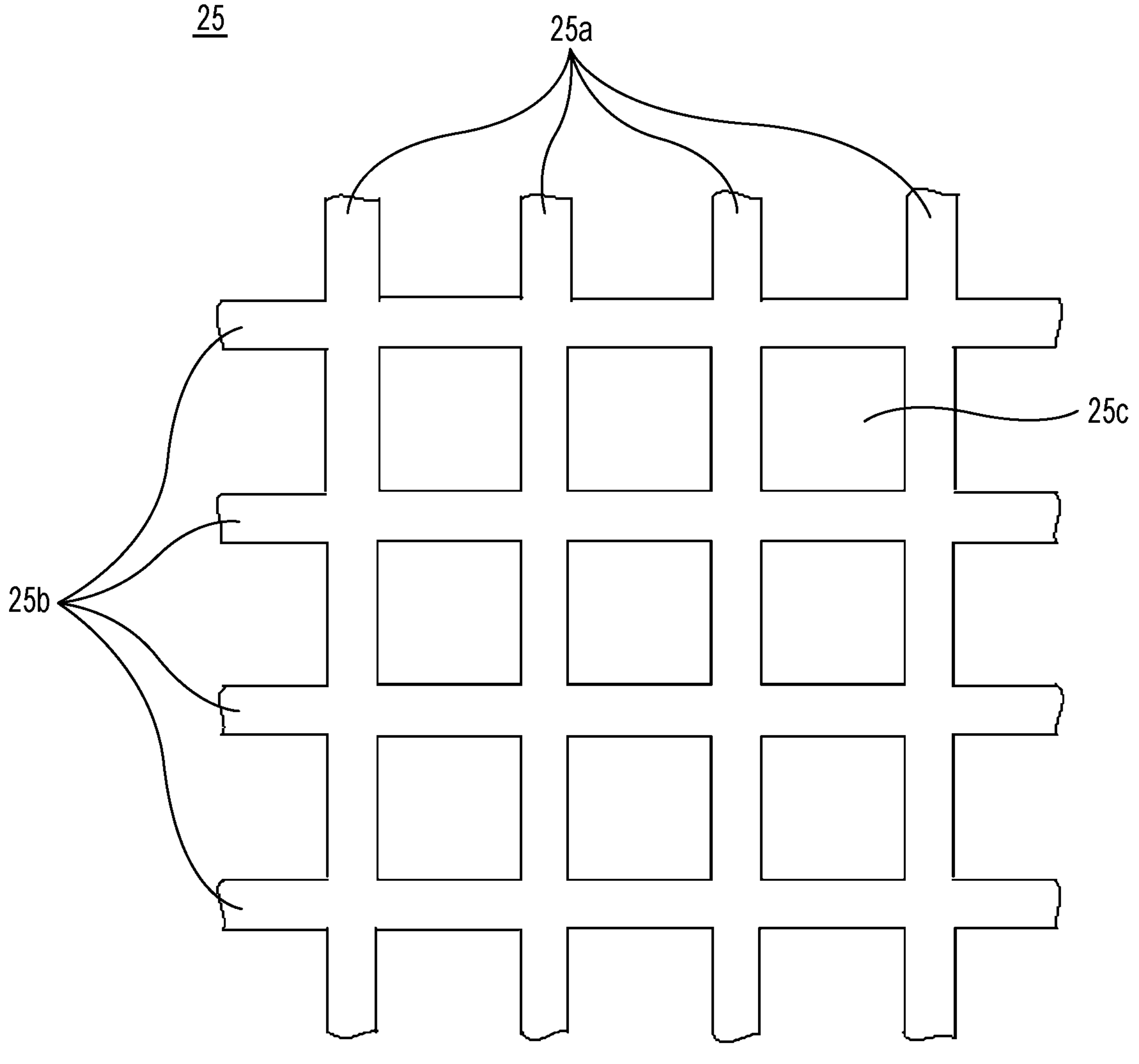
FIG. 3 is a diagram partially showing the porous body according to the first embodiment of the present invention.

Next, the porous body of the present embodiment will be described in detail based on FIGS. 1 to 3. FIG. 3 is a diagram partially showing the third porous body 25 of the present embodiment.

As described above, the third porous body 25 is a tip side porous body arranged in the vicinity of the discharge port 21*d*. Specifically, "the third porous body 25 is arranged in the vicinity of the discharge port 21*d*" means that the distance from the surface of the third porous body 25 at the side of discharge port 21*d* to the opening surface of the discharge port 21*d* is within a specific range, for example, the distance may be 20 mm or less.

As shown in FIG. 3, the third porous body 25 has a mesh shape. Specifically, the third porous body 25 has a plurality of filamentary portions 25*a* extending along the first direction with a certain interval from each other, and a plurality of filamentary portions 25*b* extending along the second direction orthogonal to the first direction with a certain interval from each other. A plurality of pore portions 25*c* having a substantially rectangular shape are defined by the plurality of filamentary portions 25*a* and the plurality of filamentary portions 25*b*. The shape of the pore portion 25*c* is not necessarily limited to a rectangular shape, and may be various shapes such as a circle, an ellipse, a triangle, and a polygon.

In the present embodiment, in the third porous body 25, the plurality of filamentary portions 25*a* and the plurality of filamentary portions 25*b* are arranged at equal intervals, respectively, and the interval between the adjacent filamentary portions 25*a* is substantially the same as that between the adjacent filamentary portions 25*b*, and thus each pore portion 25*c* has a substantially square shape with the same size. In addition, the interval between the adjacent filamentary portions 25*a* and the interval between the adjacent filamentary portions 25*b* may be different, whereby each pore portion 25*c* has a substantially rectangular shape with the same size.

Here, the third porous body 25, more specifically, the filamentous portion 25*a* and the filamentary portion 25*b* constituting the third porous body 25 are preferably composed of polyethylene terephthalate (PET). By arranging the third porous body 25 composed of PET in the vicinity of the discharge port 21*d*, it is possible to prevent the pores of the porous body from clogging due to drying and solidification of the liquid composition on the porous body while maintaining good foam quality. The reason for this is considered to be that the contact angle between the surface of the porous body composed of polyethylene terephthalate and water is large, and the hydrophobicity is strong, so that the liquid composition is not easily adhered to the porous body composed of polyethylene terephthalate with strong hydrophobicity, thereby playing effects on suppressing clogging of the porous body due to drying and solidification of the liquid composition on the porous body.

As such a porous body composed of PET, a porous body obtained by a usual method, specifically, a porous body obtained by weaving a plain weave or a twill weave from a PET monofilament by a flexible rapier loom can be used.

In addition, the third porous body may be composed of one or more pieces of porous body made of PET. From the viewpoint of preventing pores clogging of the third porous body 25, the third porous body is preferably composed of one piece of porous body made of PET.

From the viewpoint of preventing pores clogging of the third porous body 25, the mesh number of the third porous body 25 is preferably 100 mesh or more, and from the viewpoint of obtaining fine and rich foam, the mesh number of the third porous body 25 is preferably 350 mesh or less, more preferably 300 mesh or less, and further preferably 200 mesh or less.

In addition, the thickness of the third porous body 25 is not particularly limited, but may be about 50 to 120 μm from the viewpoint of both strength and suppression of clogging.

The first porous body 23 and the second porous body 24 have the same structure as the third porous body 25. That is, the first porous body 23 and the second porous body 24 have mesh shapes. The first porous body 23 and the second porous body 24 comprise a plurality of filamentary portions extending along the first direction with a certain interval from each other and a plurality of filamentary portions extending along the second direction orthogonal to the first direction with a certain interval from each other, these filamentary portions define a plurality of pore portions having a substantially rectangular shape. The shape of the pore portion is not necessarily limited to a rectangular shape, and may be various shapes such as a circle, an ellipse, a triangle, and a polygon.

The material constituting the first porous body 23 and the second porous body 24 is not particularly limited, and the same material as the third porous body 25 may be used, or a material which is different from the third porous body 25 and commonly used in conventional foam discharge containers may be used. For example, the first porous body 23 and the second porous body 24 may be composed of any material such as nylon, polyethylene, and polypropylene. Among them, it is preferable that the materials constituting the first porous body 23 and the second porous body 24 are the same as those of the third porous body 25 from the viewpoint of easiness of manufacture.

From the viewpoint of obtaining fine and rich foam, the mesh number of the first porous body 23 is preferably 200 mesh or more and 350 mesh or less, more preferably 200 mesh or more and 300 mesh or less, and further preferably 200 mesh or more and 250 mesh or less; the mesh number of the second porous body 24 is preferably 200 mesh or more and 350 mesh or less, more preferably 250 mesh or more and 350 mesh or less, and further preferably 300 mesh or more and 350 mesh or less.

Among the first to third porous bodies 23 to 25, the mesh number of the third porous body 25 is preferably smaller than that of the first porous body 23 and the second porous body 24 which are arranged on the upstream side of the third porous body 25. In this case, the foam of the liquid composition passes through the third porous body 25 again before being discharged from the discharge port, so that a finer and more uniform foam can be formed, and at the same time, by making the mesh number of the third porous body 25 smaller than that of first porous body 23 and the second porous body 24 upstream, it can help to suppress clogging of the porous body due to drying and solidification of the liquid composition on the porous body. In addition, the mesh number of each porous body is not limited to this example, the mesh number of the third porous body 25 may be the same as the mesh number of the first porous body 23 and the second porous body 24, and the mesh number of each porous body may also be arbitrarily arranged within the above range.

3. Liquid Composition

The following liquid compositions are preferably used in the foam discharge container of the present invention. Here, the components of the liquid composition preferably used in the foam discharge container of the present embodiment described above will be described.

From the viewpoint of good foamability, the liquid composition of the present invention preferably contains a generally used foamable surfactant. As the foamable surfactant, any one or two or more of anionic surfactants, amphoteric surfactants, and nonionic surfactants may be used.

Examples of anionic surfactants include alkylbenzene sulfonates, alkyl or alkenyl ether sulfates, alkyl or alkenyl sulfates, olefin sulfonates, alkane sulfonates, saturated or unsaturated fatty acid salts, alkyl or alkenyl ether carboxylates, α-sulfonated fatty acid salts, N-acyl amino acid type surfactants, phosphate monoester or diester type surfactants, sulfosuccinates, etc. Among them, saturated or unsaturated fatty acid salts, and alkyl or alkenyl ether carboxylates are preferred from the viewpoint of good foamability. Examples of the saturated or unsaturated fatty acid salts include straight chain or branched chain alkyl or alkenyl fatty acid salts having carbon atom number of 9-21, and more specifically, salts of lauric acid, myristic acid, palmitic acid, stearic acid, isostearic acid, oleic acid, arachidic acid and behenic acid and the like. Furthermore, examples of these salts include alkali metals such as sodium and potassium; alkaline earth metals such as calcium and magnesium; ammonium, the ammonium obtained from alkanolamines such as monoethanolamine, diethanolamine, triethanolamine, and aminomethyl propanol; cations derived from alkaline amino acids such as arginine and lysine. Examples of the alkyl or alkenyl ether carboxylates include fatty alcohol polyether carboxylates having 10 to 18 carbon atoms, and more specifically, salts of laureth carboxylic acid, myreth carboxylic acid, pareth carboxylic acid, and the like. Examples of these salts include alkali metals such as sodium and potassium; alkaline earth metals such as calcium and magnesium; ammonium, the ammonium obtained from alkanolamines such as monoethanolamine, diethanolamine, triethanolamine, and aminomethyl propanol; cations derived from alkaline amino acids such as arginine and lysine.

Examples of the amphoteric surfactant include imidazoline-based, carbobetaine-based, amido betaine-based, sulphobetaine-based, hydroxysulfobetaine-based, and amidosulfobetaine-based surfactants. Among them, from the viewpoint of good foamability, hydroxysulfobetaines and sulphobetaines are preferred. Examples of hydroxysulfobetaines include coconut oil fatty acid hydroxysulfobetaine, lauryl hydroxysulfobetaine, tetradecyl hydroxysulfobetaine, and the like.

Examples of nonionic surfactant include polyethers, glycoside derivatives, ethoxylated oils and fats, alkyl alcohol amides, etc. Among them, glycoside derivatives are preferred from the viewpoint of good foamability. As a glycoside derivative, an alkyl glucoside, a sucrose fatty acid ester, etc. are mentioned.

From the viewpoint of obtaining good foamability and suppressing clogging of the third porous body 25, the content of the above-mentioned foamable surfactant in the liquid composition is preferably 0.5 mass % or more, and more preferably 2 mass % or more, further preferably 5 mass % or more, in addition, preferably 20 mass % or less, more preferably 15 mass % or less, further preferably 12 mass % or less.

Furthermore, the liquid composition used in the present invention preferably contains alcohols with IOB value of 0.55~5.0 as component (A) from the viewpoint of dissolving the liquid composition remaining on the porous body 25, preventing clogging and not impairing the foam quality.

Examples of the alcohol of the component (A) include glycerin (IOB: 5), propylene glycol (IOB: 3.3), methyl gluceth-20 (IOB: 2.1), 1,2-hexanediol (IOB: 1.7), ethoxydiglycol (IOB: 1.6), PPG-9 diglyceryl ether (IOB: 0.9), diethylene glycol monobutyl ether (IOB: 0.9), phenoxyethanol (IOB: 0.8), polypropylene glycol-9 (IOB: 0.7), ethylhexyl glyceryl ether (IOB: 0.55), ethanol (IOB: 2.5), etc.

From the viewpoint of dissolving the liquid composition remaining on the third porous body 25 and suppressing clogging, the component (A) is preferably an alcohol having an IOB value of 5.0 or less.

Here, the IOB value represents the ratio (Inorganic Organic Balance) of inorganic value and organic value obtained according to organic conceptional diagram (Atsushi Fujita, Prediction of Organic Compounds and Organic Conceptional Diagram, Chemical Field Vol. 11, No. 10 (1957) P719-725), and is obtained by the following formula.

IOB value=inorganic value/organic value

From the viewpoint of achieving both good foam quality and suppression of clogging of the third porous body 25, 1,2-hexanediol (IOB: 1.7), diethylene glycol monobutyl ether (IOB: 0.9), phenoxyethanol (IOB: 0.8) are preferred.

The above-mentioned alcohols may be used alone or in combination of two or more.

The content of the component (A) in the liquid composition is preferably 2 mass % or more, and more preferably 4 mass % or more, further preferably 5 mass % or more, further more preferably 6 mass % or more, in addition, preferably 50 mass % or less, more preferably 48 mass % or less, further preferably 45 mass % or less, further more preferably 30 mass % mass % or less, from the viewpoint of suppressing pore clogging due to drying and solidification of the liquid composition on the third porous body 25 and the viewpoint of maintaining good foam quality.

The liquid composition can also contain other components within the range of not damaging the effect of the invention. The other components can be appropriately selected according to the use and purpose of the composition. Examples of the other ingredients include humectants, chelators, vitamins, antioxidants, preservatives, colorants, viscosity regulators, pH regulators, spices, etc. Any one or more of these can be arbitrarily added to the liquid composition.

In addition, the use of the liquid composition is not particularly limited. For example, skin cleanser compositions such as hand sanitizer, shower gel, facial cleanser; skin cosmetics such as lotion, beauty lotion; hair cosmetics such as shaving cosmetics, hair styling agents, shampoo, hair conditioner; dishwashing detergent and the like can be listed, among which, a skin cleaner composition is preferred.

4. Use of Foam Discharge Container

Next, the use of the foam discharge container 1 will be described. If the user presses the discharge head 21 of the foam discharge container 1, the liquid composition and air are supplied to the mixing chamber 29 through the pump mechanism. In the mixing chamber 29, the liquid composition is mixed with air, thereby generating foam. The generated foam is discharged from the discharge port 21*d* to the outside through the internal flow paths 21*a*-1 and 21*c*-1, and when the foam generated in the mixing chamber 29 passes through the internal flow path 21*a*-1, it passes through the first porous body 23 and the second porous body 24 in turn to become fine foam. Thereafter, the foam of the liquid composition passes through the third porous body 25 to become a more fine and uniform foam, which is discharged to the outside.

In addition, from the viewpoint of obtaining good foam quality, the foam is discharged from the discharge port 21*d* at a volume ratio of air to the liquid composition (air/liquid composition) of 15/1 or more, preferably 16/1 or more, further preferably 17/1 or more, further more preferably 20/1 or more. Furthermore, from the viewpoint of miniaturization of the foam discharge container 1, the foam is discharged from the discharge port 21*d* at a volume ratio of air to the liquid composition (air/liquid composition) of 38/1 or less, preferably 30/1 or less, further preferably 29/1 or less, further more preferably 26/1 or less.

In addition, the foam discharge container 1 in this embodiment comprises three porous bodies, but the number of porous bodies is not limited to three. As long as the number of porous bodies is two or more. In addition, the configuration of porous bodies is not limited to the example shown in FIG. 1. That is, as long as at least one of the plurality of porous bodies is a tip side porous body. For example, any one of the first porous body 23 and the second porous body 24 among the first to third porous bodies 23 to 25 can be omitted, and other inner side porous bodies besides the first porous body 23 and the second porous body 24 can be configured in the internal flow path 21*a*-1. In addition, other tip side porous bodies besides the third porous body 25 may be arranged in the vicinity of the discharge port 21*d*.

Second Embodiment

Figure 4:
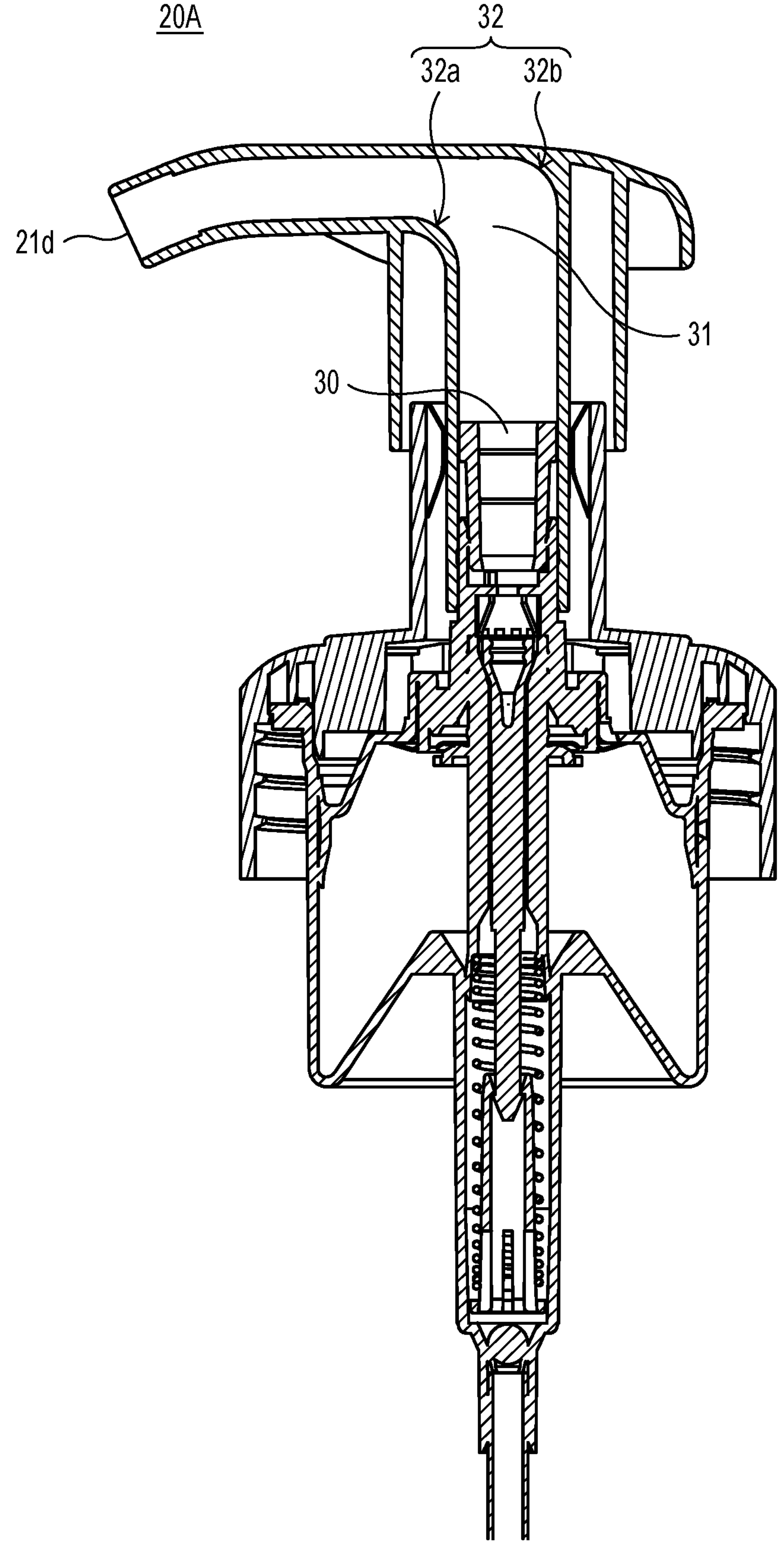
FIG. 4 is a cross-sectional view showing a foam discharge device according to the second embodiment of the present invention.
Figure 5:
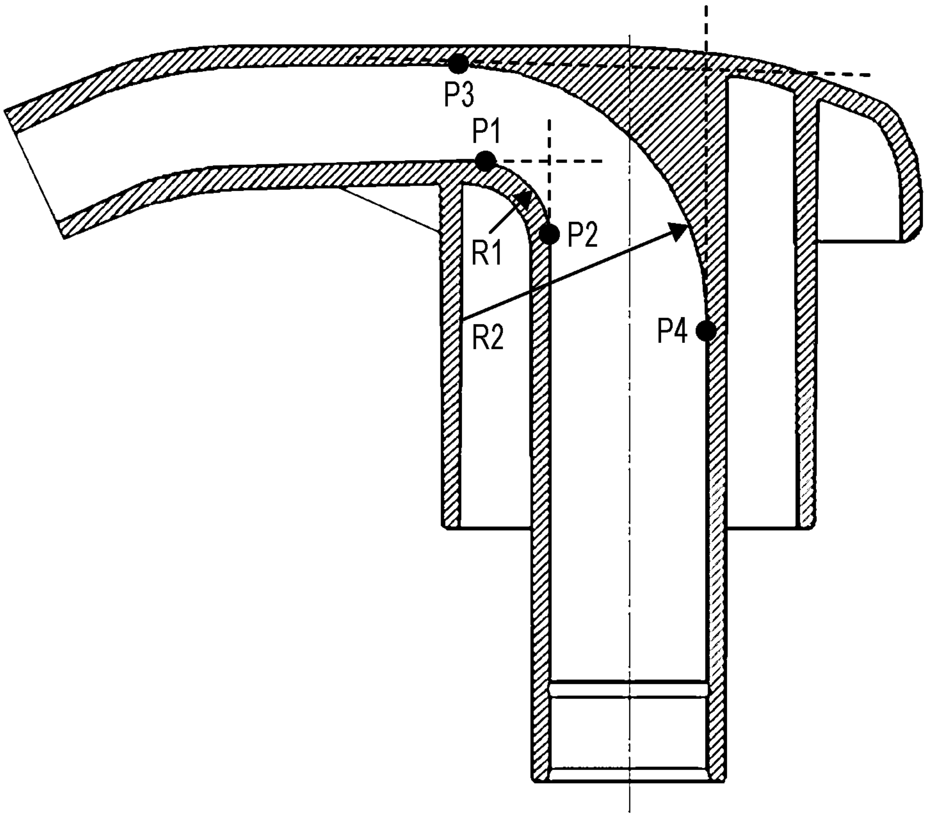
FIG. 5 is a schematic diagram showing the maximum value of the arc radius of the curve corner of the foam discharge device according to the second embodiment of the present invention.
Figure 6:
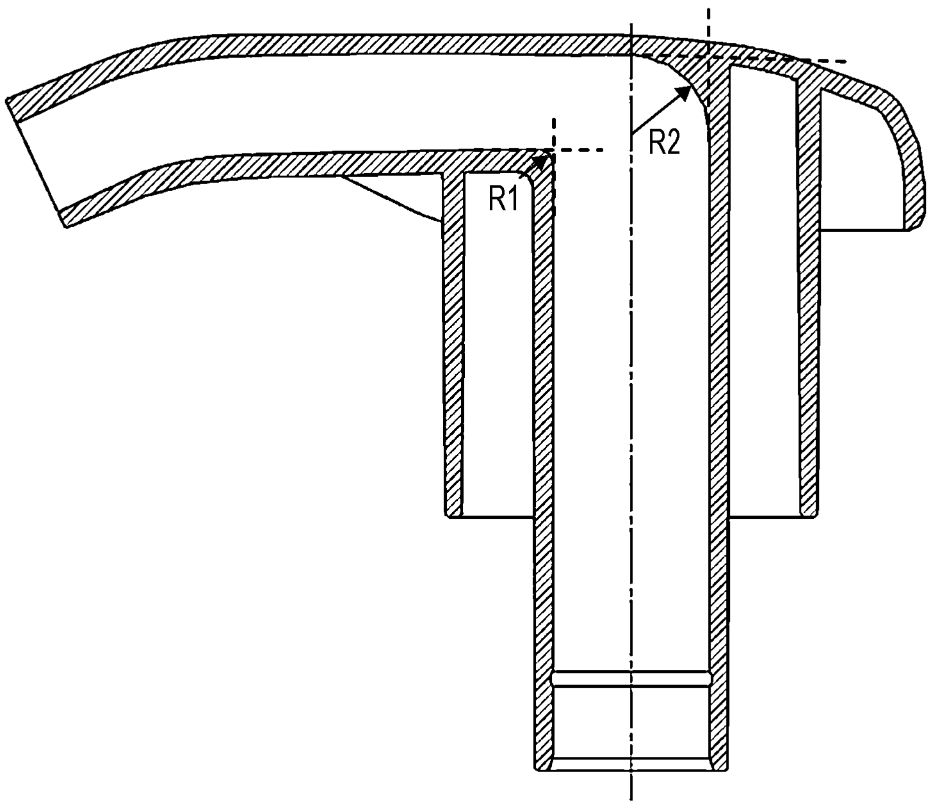
FIG. 6 is a schematic diagram showing the minimum value of the arc radius of the curve corner of the foam discharge device according to the second embodiment of the present invention.

FIG. 4 is a cross-sectional view showing a foam discharge device according to the second embodiment of the present invention. FIG. 5 is a schematic diagram showing the maximum value of the arc radius of the curve corner of the foam discharge device according to the second embodiment of the present invention. FIG. 6 is a schematic diagram showing the minimum value of the arc radius of the curve corner of the foam discharge device according to the second embodiment of the present invention.

The foam discharge device 20A of the present embodiment is different from the foam discharge device 20 of the first embodiment in that the foam discharge device 20A does not comprise a tip side porous body but comprises an arc-shaped curve corner. The other structures of this embodiment are the same as those of the first embodiment, and therefore, the description thereof is omitted here.

As shown in FIG. 4, the foam discharge device 20A is not provided with a third porous body (tip side porous body) in the vicinity of the discharge port 21*d*. In addition, the foam discharge device 20A comprises an arc-shaped curve corner 32 defining the connection flow path 31 that communicates with the discharge port 21*d* of the foam discharge device 20A and communicates with the pump core flow path 30, and the curve corner 32 includes an inside curve corner 32*a* and an outside curve corner 32*b*.

In addition, as shown in FIG. 5, the tangent of the starting point P1 and the tangent of the end point P2 of the inside curve corner 32*a* intersect in a vertical manner, and the tangent of the starting point P3 and the tangent of the end point P4 of the outside curve corner 32*b* intersect in a vertical manner.

In addition, in the case shown in FIG. 5, the arc radius R1 of the inside curve corner 32*a* is the maximum value and is 5 mm, and the arc radius R2 of the outside curve corner 32*b* is the maximum value and is 16 mm. In the case shown in FIG. 6, the arc radius R1 of the inside curve corner 32*a* is the minimum value and is 1 mm, and the arc radius R2 of the outside curve corner 32*b* is the minimum value and is 5 mm. That is, the arc radius R1 of the inside curve corner 32*a* is in the range of 1 to 5 mm, and the arc radius R2 of the outside curve corner 32*b* is in the range of 5 to 16 mm. In this way, by setting the arc radius R1 of the inside curve corner 32*a* in the range of 1 to 5 mm and the arc radius R2 of the outside curve corner 32*b* in the range of 5 to 16 mm, it is possible to effectively reduce the pressing force when pressing the foam discharge device.

In addition, the arc radius is the arc radius obtained from the cross-sectional view passing through the center of the connection flow path 31. This cross-sectional view is a cross-sectional view passing through the center of the connection flow path 31 in the front-rear direction with the discharge direction of the discharge port 21*d* as the front direction and the opposite direction as the rear direction in the foam discharge device 20A.

In addition, the liquid composition used in this embodiment, the volume ratio of air to the liquid composition (air/liquid composition), and the use of the foam discharge container of this embodiment are the same as those in the above-mentioned first embodiment. Therefore, the description thereof is omitted here.

Variation of the Second Embodiment

Figure 7:
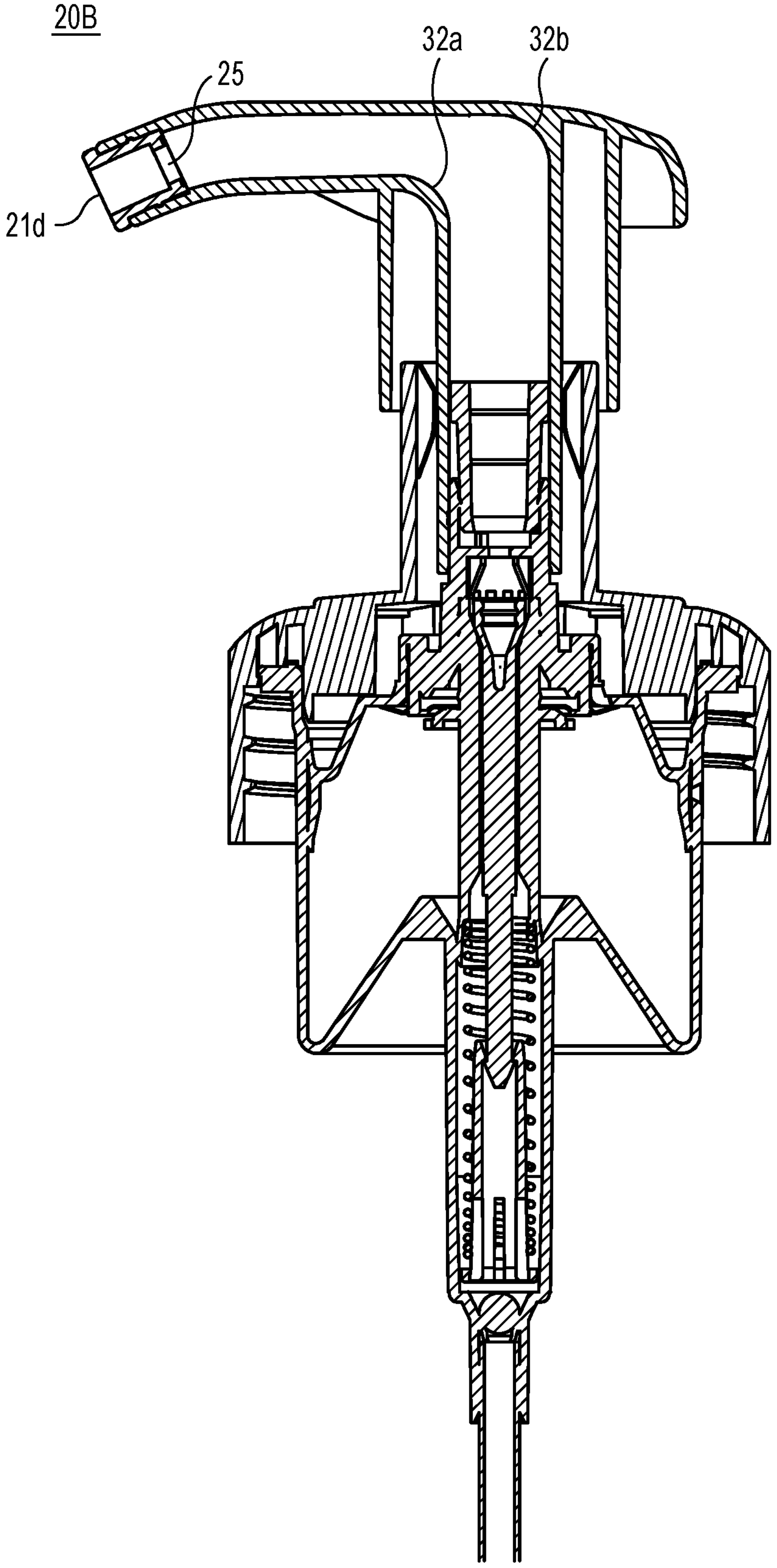
FIG. 7 is a cross-sectional view showing a foam discharge device according to a variation of the second embodiment of the present invention.

FIG. 7 is a cross-sectional view showing a foam discharge device according to a variation of the second embodiment of the present invention. The foam discharge device 20B of this variation is different from the foam discharge device 20A of the second embodiment in that the foam discharge device 20B further includes the third porous body (the tip side porous body) 25 as in the first embodiment described above.

The other structures of this variation are the same as those of the second embodiment, and therefore, the description thereof is omitted here.

As shown in FIG. 7, the third porous body 25 is a tip side porous body arranged in the vicinity of the discharge port 21*d*. Specifically, "the third porous body 25 is arranged in the vicinity of the discharge port 21*d*" means that the distance from the surface of the third porous body 25 at the side of the discharge port 21*d* to the opening surface of the discharge port 21*d* is within a specific range, for example, the distance may be 20 mm or less.

The third porous body 25 has a mesh shape as in the above-described first embodiment. Specifically, the third porous body 25 comprises a plurality of filamentary portions 25*a* extending along the first direction with a certain interval from each other, and a plurality of filamentary portions 25*b* extending along the second direction orthogonal to the first direction with a certain interval from each other. A plurality of pore portions 25*c* having a substantially rectangular shape are defined by the plurality of filamentary portions 25*a* and the plurality of filamentary portions 25*b*. The shape of the pore portion 25*c* is not necessarily limited to a rectangular shape, and may be various shapes such as a circle, an ellipse, a triangle, and a polygon.

In the present embodiment, in the third porous body 25, the plurality of filamentary portions 25*a* and the plurality of filamentary portions 25*b* are arranged at equal intervals, respectively, and the interval between the adjacent filamentary portions 25*a* is the same as that between the adjacent filamentary portions 25*b*, and thus each pore portion 25*c* has a substantially square shape with the same size. In addition, the interval between the adjacent filamentary portions 25*a* and the interval between the adjacent filamentary portions 25*b* may be different, whereby each pore portion 25*c* has a substantially rectangular shape with the same size.

Here, the third porous body 25, more specifically, the filamentous portion 25*a* and the filamentary portion 25*b* constituting the third porous body 25 are preferably composed of polyethylene terephthalate (PET). By arranging the third porous body 25 composed of PET in the vicinity of the discharge port 21*d*, it is possible to suppress pores clogging of the porous body due to drying and solidification of the liquid composition on the porous body while maintaining good foam quality. The reason for this is considered to be that the contact angle between the surface of the porous body composed of polyethylene terephthalate and water is large, and the hydrophobicity is strong, so that the liquid composition is not easily adhered to the porous body composed of polyethylene terephthalate with strong hydrophobicity, thereby playing effects on suppressing clogging of the porous body due to drying and solidification of the liquid composition on the porous body.

As such a porous body composed of PET, a porous body obtained by a usual method, specifically, a porous body obtained by weaving a plain weave or a twill weave from a PET monofilament by a flexible rapier loom can be used.

In addition, the third porous body may be composed of one or more pieces of porous body made of PET. From the viewpoint of suppressing pores clogging of the third porous body 25, the third porous body is preferably composed of one piece of porous body made of PET.

From the viewpoint of preventing the pore clogging of the third porous body 25, the mesh number of the third porous body 25 is preferably 100 mesh or more. In addition, from the viewpoint of obtaining fine and rich foam, the mesh number of the third porous body 25 is preferably 350 mesh or less, more preferably 300 mesh or less, and further preferably 200 mesh or less.

In addition, the thickness of the third porous body 25 is not particularly limited, and can be 50-120 μm or so, from the viewpoint of considering both strength and suppression of clogging.

In addition, the liquid composition used in this variation, the volume ratio of air to liquid composition (air/liquid composition), and the use of foam discharge container in this variation are the same as those in the first embodiment, so the description is omitted here.

Regarding the above-mentioned embodiments, the present invention further discloses the following foam discharge containers.

<1> A foam discharge container, wherein the foam discharge container comprises a container main body for accommodating a liquid composition, and a foam discharge device for mixing the liquid composition contained in the container main body with air and discharging it in a foam form, the foam discharge device comprises a plurality of porous bodies through which the liquid composition passes when discharging the liquid composition, the plurality of porous bodies comprise a tip side porous body arranged in the vicinity of the discharge port of the foam discharge device, the tip side porous body is composed of polyethylene terephthalate (PET).

<2> The foam discharge container according to the above <1>, wherein the tip side porous body has a mesh shape.

<3> The foam discharge container according to the above <1> or <2>, wherein the tip side porous body is obtained by weaving a plain weave or a twill weave from a PET monofilament by a flexible rapier loom.

<4> The foam discharge container according to any one of the above <1> to <3>, wherein the tip side porous body is composed of one piece or more pieces of porous bodies made of PET, preferably composed of one piece of porous body made of PET.

<5> The foam discharge container according to any one of the above <1> to <4>, wherein the mesh number of the tip side porous body is preferably 100 mesh or more, and preferably 350 mesh or less, and more preferably 300 mesh or less, further preferably 200 mesh or less.

<6> The foam discharge container according to any one of the above <1> to <5>, wherein the thickness of the tip side porous body is 50 to 120 μm.

<7> The foam discharge container according to any one of the above <1> to <6>, wherein the plurality of porous bodies comprise an inner side porous body arranged on the upstream side of the tip side porous body.

<8> The foam discharge container according to the above <7>, wherein the material of the inner side porous body is the same as or different from the material of the tip side porous body, and it is preferably composed of the same material as the material of the tip side porous body.

<9> The foam discharge container according to the above <7> or <8>, wherein the number of the inner side porous body is one or two or more, preferably two or more, and more preferably two.

<10> The foam discharge container according to any one of the above <7> to <9>, wherein in the case of that the inner side porous body is composed of a first inner side porous body and a second inner side porous body, the mesh number of the first inner side porous body is preferably 200 mesh or more and 350 mesh or less, more preferably 200 mesh or more and 300 mesh or less, further preferably 200 mesh or more and 250 mesh or less; the mesh number of the second inner side porous body is preferably 200 mesh or more and 350 mesh or less, more preferably 250 mesh or more and 350 mesh or less, and further preferably 300 mesh or more and 350 mesh or less.

<11> The foam discharge container according to any one of the above <1> to <10>, wherein the foam is discharged from the discharge port 21*d* at a volume ratio of the air to the liquid composition (air/liquid composition) of 15/1 or more, preferably 16/1 or more, more preferably 17/1 or more, further more preferably 20/1 or more. Furthermore, the foam is discharged from the discharge port 21*d* at a volume ratio of the air to the liquid composition (air/liquid composition) of 38/1 or less, preferably 30/1 or less, more preferably 29/1 or less, further more preferably 26/1 or less.

<12> The foam discharge container according to any one of the above <1> to <11>, wherein the foam discharge device preferably comprises an arc-shaped curve corner defining a connection flow path that communicates with the discharge port and communicates with the pump core flow path, the curve corner includes an inside curve corner and an outside curve corner.

<13> The foam discharge container according to the above <12>, wherein the tangent of the starting point and the tangent of the ending point of the curve corner preferably intersect in a vertical manner.

<14> The foam discharge container according to the above <12> or <13>, wherein the arc radius of the inside curve corner is preferably 1 to 5 mm, and the arc radius of the outside curve corner is preferably 5 to 16 mm.

<15> A foam discharge container, wherein, comprising:

the foam discharge device of the foam discharge container according to any one of the above <1> to <14>; and the container main body containing the liquid composition, the liquid composition contains alcohols with IOB value of 0.55~5.0 as component (A).

<16> The foam discharge container as described in the above <15>, wherein the component (A) is one or more selected from the group consisting of glycerine, propylene glycol, methyl gluceth-20, 1,2-hexanediol, ethoxydiglycol, PPG-9 diglyceryl ether, diethylene glycol monobutyl ether, phenoxyethanol, polypropylene glycol-9, ethylhexyl glyceryl ether and ethanol, preferably one or more selected from alcohols with an IOB value of 5.0 or less, more preferably one or more selected from the group consisting of 1,2-hexanediol, diethylene glycol monobutyl ether and phenoxyethanol.

<17> The foam discharge container described in the above <15> or <16>, wherein the content of the component (A) in the liquid composition is preferably 2 mass % or more, more preferably 4 mass % or more, further preferably 5 mass % or more, further more preferably 6 mass % or more, in addition, preferably 50 mass % or less, more preferably 48 mass % or less, further preferably 45 mass % or less, further more preferably 30 mass % or less.

<18> The foam discharge container described in any one of the above <15> to <17>, wherein the liquid composition preferably contains a foamable surfactant, more preferably one or more selected from the group consisting of anionic surfactants, amphoteric surfactants, and non-ionic surfactants.

<19> The foam discharge container according to the above <18>, wherein the anionic surfactant is preferably alkylbenzene sulfonate, alkyl or alkenyl ether sulfate, alkyl or alkenyl sulfate, olefin sulfonate, alkane sulfonate, saturated or unsaturated fatty acid salt, alkyl or alkenyl ether carboxylate, α-sulfonated fatty acid salt, N-acyl amino acid surfactant, phosphate monoester or diester surfactant, sulfosuccinate ester salt, more preferably saturated or unsaturated fatty acid salt, alkyl or alkenyl ether carboxylate, further preferably straight chain or branched chain alkyl or alkenyl fatty acid salts having carbon atom number of 9-21, fatty alcohol polyether carboxylate having carbon atom number of 10-18, further more preferably salts of lauric acid, myristic acid, palmitic acid, stearic acid, isostearic acid, oleic acid, arachidic acid and behenic acid; salts of laureth carboxylic acid, myreth carboxylic acid, pareth carboxylic acid.

<20> The foam discharge container according to the above <18>, wherein the amphoteric surfactant is preferably imidazoline-based, carbobetaine-based, amido betaine-based, sulphobetaine-based, hydroxysulfobetaine-based, amidosulfobetaine-based surfactants, more preferably hydroxysulfobetaine-based, sulphobetaine-based, and further preferably coconut oil fatty acid hydroxysulfobetaine, lauryl hydroxysulfobetaine, tetradecyl hydroxysulfobetaine.

<21> The foam discharge container according to the above <18>, wherein the nonionic surfactant is preferably polyethers, glycoside derivatives, ethoxylated oils and fats, and alkyl alcohol amides, more preferably glycoside derivatives, and further preferably alkyl glucosides and sucrose fatty acid esters.

<22> The foam discharge container according to any one of the above <18> to <21>, wherein the content of the foamable surfactant in the liquid composition is preferably 0.5 mass % or more, and more preferably 2 mass % or more, further preferably 5 mass % or more, in addition, preferably 20 mass % or less, more preferably 15 mass % or less, further preferably 12 mass % or less.

<23> The foam discharge container according to any one of the above <15> to <22>, wherein the liquid composition is preferably a skin cleanser composition, a skin cosmetic, a hair cosmetic, or a dishwashing detergent, more preferably a skin cleanser composition.

In addition to the above, the present invention further discloses the following foam discharge containers regarding the above-mentioned embodiments.

[1] A foam discharge container, wherein the foam discharge container comprising: a container main body for accommodating a liquid composition, and a foam discharge device for mixing the liquid composition contained in the container main body with air and discharging it in a foam form, The foam discharge device comprises an arc-shaped curve corner defining a connection flow path that communicates with the discharge port of the foam discharge device and communicates with the pump core flow path, The curve corner includes an inside curve corner and an outside curve corner.

[2] The foam discharge container according to the above [1], wherein the tangent of the starting point and the tangent of the ending point of the curve corner intersect in a vertical manner.

[3] The foam discharge container according to the above [1] or [2], wherein the arc radius of the inside curve corner is 1 to 5 mm, and the arc radius of the outside curve corner is 5 to 16 mm.

[4] The foam discharge container according to any one of the above [1] to [3], wherein a tip side porous body is provided in the vicinity of the discharge port of the foam discharge device.

[5] The foam discharge container according to the above [4], wherein the tip side porous body has a mesh shape.

[6] The foam discharge container according to the above [4] or [5], wherein the tip side porous body is obtained by weaving a plain weave or a twill weave from a PET monofilament by a flexible rapier loom.

[7] The foam discharge container according to any one of the above [4] to [6], wherein the tip side porous body is composed of one piece or more pieces of porous bodies made of PET, preferably composed of one piece of porous body made of PET.

[8] The foam discharge container according to any one of the above [4] to [7], wherein the mesh number of the tip side porous body is preferably 100 mesh or more, and preferably 350 mesh or less, and more preferably 300 mesh or less, and further preferably 200 mesh or less.

[9] The foam discharge container according to any one of the above [4] to [8], wherein the thickness of the tip side porous body is 50 to 120 μm.

[10] The foam discharge container according to any one of the above [4] to [9], wherein the plurality of porous bodies comprise an inner side porous body arranged on the upstream side of the tip side porous body.

[11] The foam discharge container according to the above [10], wherein the material of the inner side porous body is the same as or different from the material of the tip side porous body, and it is preferably composed of the same material as the material of the tip side porous body.

[12] The foam discharge container according to the above [10] or [11], wherein the number of the inner side porous body is one or two or more, preferably two or more, and more preferably two.

[13] The foam discharge container according to any one of the above [10] to [12], wherein in the case of that the inner side porous body is composed of a first inner side porous body and a second inner side porous body, the mesh number of the first inner side porous body is preferably 200 mesh or more and 350 mesh or less, more preferably 200 mesh or more and 300 mesh or less, further preferably 200 mesh or more and 250 mesh or less; the mesh number of the second inner side porous body is preferably 200 mesh or more and 350 mesh or less, more preferably 250 mesh or more and 350 mesh or less, and further preferably 300 mesh or more and 350 mesh or less.

[14] The foam discharge container according to any one of the above [1] to [13], wherein the foam is discharged from the discharge port 21*d* at the volume ratio of the air to the liquid composition (air/liquid composition) of 15/1 or more, preferably 16/1 or more, further preferably 17/1 or more, and further more preferably 20/1 or more.

Furthermore, the foam is discharged from the discharge port 21*d* at the volume ratio of the air to the liquid composition (air/liquid composition) of 38/1 or less, preferably 30/1 or less, more preferably 29/1 or less, further more preferably 26/1 or less.

[15] A foam discharge container, comprising:

the foam discharge device of the foam discharge container according to any one of the above [1] to [14]; and a container main body containing a liquid composition, The liquid composition contains alcohols with IOB value of 0.55~5.0 as component (A).

[16] The foam discharge container according to the above [15], wherein the component (A) is one or more selected from the group consisting of glycerine, propylene glycol, methyl gluceth-20, 1,2-hexanediol, ethoxydiglycol, PPG-9 diglyceryl ether, diethylene glycol monobutyl ether, phenoxyethanol, polypropylene glycol-9, ethylhexyl glyceryl ether and ethanol, preferably one or more selected from alcohols with an IOB value of 5.0 or less, more preferably one or more selected from the group consisting of 1,2-hexanediol, diethylene glycol monobutyl ether and phenoxyethanol.

[17] The foam discharge container according to the above [15] or [16], wherein the content of the component (A) in the liquid composition is preferably 2 mass % or more, more preferably 4 mass % or more, further preferably 5 mass % or more, further more preferably 6 mass % or more, in addition, preferably 50 mass % or less, more preferably 48 mass % or less, further preferably 45 mass % or less, further more preferably 30 mass % or less.

[18] The foam discharge container according to any one of the above [15] to [17], wherein the liquid composition preferably contains a foamable surfactant, more preferably one or more selected from the group consisting of anionic surfactants, amphoteric surfactants, and non-ionic surfactants.

[19] The foam discharge container according to the above [18], wherein the anionic surfactant is preferably alkylbenzene sulfonate, alkyl or alkenyl ether sulfate, alkyl or alkenyl sulfate, olefin sulfonate, alkane sulfonate, saturated or unsaturated fatty acid salt, alkyl or alkenyl ether carboxylate, α-sulfonated fatty acid salt, N-acyl amino acid surfactant, phosphate monoester or diester surfactant, sulfonated succinate salt, more preferably saturated or unsaturated fatty acid salt, alkyl or alkenyl ether carboxylate, further preferably straight chain or branched chain alkyl or alkenyl fatty acid salts having carbon atom number of 9-21, fatty alcohol polyether carboxylate having carbon atom number of 10-18, further more preferably salts of lauric acid, myristic acid, palmitic acid, stearic acid, isostearic acid, oleic acid, arachidic acid and behenic acid; salts of laureth carboxylic acid, myreth carboxylic acid, pareth carboxylic acid.

[20] The foam discharge container according to the above [18], wherein the amphoteric surfactant is preferably imidazoline-based, carbobetaine-based, amido betaine-based, sulphobetaine-based, hydroxysulfobetaine-based, amidosulfobetaine-based surfactants, more preferably hydroxysulfobetaine-based, sulphobetaine-based, and further preferably coconut oil fatty acid hydroxysulfobetaine, lauryl hydroxysulfobetaine, tetradecyl hydroxysulfobetaine.

[21] The foam discharge container according to the above [18], wherein the nonionic surfactant is preferably polyethers, glycoside derivatives, ethoxylated oils and fats, and alkyl alcohol amides, more preferably glycoside derivatives, and further preferably alkyl glucosides and sucrose fatty acid esters.

[22] The foam discharge container according to any one of the above [18] to [21], wherein the content of the foamable surfactant in the liquid composition is preferably 0.5 mass % or more, and more preferably 2 mass % or more, further preferably 5 mass % or more, in addition, preferably 20 mass % or less, more preferably 15 mass % or less, further preferably 12 mass % or less.

[23] The foam discharge container according to any one of the above [15] to [22], wherein the liquid composition is preferably a skin cleanser composition, a skin cosmetic, a hair cosmetic, or a dishwashing detergent, more preferably a skin cleanser composition.

EXAMPLES

Hereinafter, the present invention will be described in more detail by way of examples. The examples are merely illustrative of the present invention, and are not intended to be limiting in any way.

Examples 1 to 17

First, a foam discharge container 1 as shown in FIGS. 1 and 2 was prepared. Each porous body in the foam discharge container 1 was changed as shown in Tables 2 to 4, respectively. In addition, "PET (200 #)" in Tables 2 to 4 refers to a porous body composed of PET with a mesh number of 200 (the trade name of PET is FC510, and the manufacturer is Sinopec Yizheng Chemical Fiber Co., Ltd.), "PET (300 #)" refers to a porous body composed of PET with a mesh number of 300 (the trade name of PET is FC510, the manufacturer is Sinopec Yizheng Chemical Fiber Co., Ltd.), and "PET (100 #)" refers to the a porous body composed of PET with a mesh number of 100 (the trade name of PET is FC510, the manufacturer is Sinopec Yizheng Chemical Fiber Co., Ltd.), "PET (350 #)" refers to a porous body composed of PET with a mesh number of 350 (the trade name of PET is FC510, the manufacturer is Sinopec Yizheng Chemical Fiber Co., Ltd.), "Nylon (200 #)" refers to a porous body composed of nylon with a mesh number of 200 (the trade name of nylon is 1010F5, the manufacturer is Japan's Mitsubishi Engineering), "Nylon (300 #)" refers to a porous body composed of nylon with a mesh number of 300 (the trade name of nylon is 1010F5, and the manufacturer is Japan's Mitsubishi Engineering). Furthermore, "inner" in Tables 2 to 4 represents the inner side porous body, and parentheses indicate the mesh diameter of the porous body.

Next, each liquid composition was prepared according to the combination and compound ratio shown in Table 1. Then, the foam discharge containers of Examples 1 to 17 and Comparative Example 1 were produced by filling the foam discharge container 1 with each of the obtained liquid compositions. In addition, the numerical value of each component in the table is a mass % with respect to the total mass of a liquid composition, and is a value as an active ingredient.

The following performance evaluations were performed using the foam discharge containers obtained in the Examples and Comparative Examples.

<Evaluation of Foam Quality>

By pressing the foam discharge containers of Examples 1 to 17 and Comparative Example 1 three times, the foam of the liquid composition was discharged from the discharge port of the foam discharge container, and the state of the foam was observed visually. Then, the foam quality was evaluated based on the following evaluation criteria, and the obtained results are shown in Tables 2 to 4 below.

6: The foam is very dense and rich
5: The foam is dense and rich
4: The foam is slightly coarser
3: The foam is slightly coarser, with a small amount of relatively larger bubbles
2: The foam is slightly coarser, with many relatively large bubbles
1: The foam is coarser with many large bubbles <Evaluation of Clogging>

Each foam discharge container was left still in a constant temperature room set at 40° C., the operation of pressing to discharge the foam was performed once a day, and the evaluation result of short-term clogging property was obtained by evaluating the presence or absence of clogging at the 90th time of pressing to discharge the foam based on the following evaluation criteria and the obtained results are shown in Tables 2 to 4 below.

Each foam discharge container was left still in a constant temperature room set at 40° C., the operation of pressing to discharge the foam was performed once a week, and the evaluation result of long-term clogging property was obtained by evaluating the presence or absence of clogging at the 12th time of pressing to discharge the foam based on the following evaluation criteria and the obtained results are shown in Tables 2 to 4 below.

5: The pump is pressed smoothly, and the feeling of pressing down does not change (there is no clogging at all)
4: The pump is pressed smoothly, and the feeling of pressing down is slightly heavier (it is slightly clogged)
3: The pump is pressed slightly unsmooth, and the feeling of pressing down is heavier (the clogging is relatively light)
2: The pump does not feel smooth to press, and the feeling of pressing down is obviously heavier (the clogging is more obvious)
1: The pump does not feel smooth when pressed, and the feeling of pressing down is obviously heavier (it is obviously clogged)

TABLE 1

| | | Liquid composition | | | | | | | | | | | |
|---|---|---|---|---|---|---|---|---|---|---|---|---|---|
| | Name | A | B | C | D | E | F | G | H | I | J | K | L |
| Component (A) | propylene glycol*[1] (IOB = 3.3) | 10 | | | | | | | | | | 7 | |
| | 1,2-hexanediol*[2] (IOB = 1.7) | | 10 | | | | | | | | | | |
| | PPG-9 diglyceryl ether *[3] (IOB = 0.9) | | | 10 | | | | | | | | | |
| | diethylene glycol monobutyl ether *[4] (IOB = 0.9) | | | | 10 | | | 2 | 4 | 6 | | | 9 |
| | phenoxyethanol*[5] (IOB = 0.8) | | | | | 10 | | | | | | 0.2 | 1 |
| | polypropylene glycol-9*[6] (IOB = 0.7) | | | | | | 10 | | | | | | |
| | glycerine*[7] (IOB = 5.0) | | | | | | | | | | 30 | 8 | |
| | ethylhexyl glyceryl ether*[8] (IOB = 0.55) | | | | | | | | | | | 0.117 | |

TABLE 1-continued

| | Name | Liquid composition A | B | C | D | E | F | G | H | I | J | K | L |
|---|---|---|---|---|---|---|---|---|---|---|---|---|---|
| Surfactant | laureth-6 carboxylic acid*9 | 1.5 | 1.5 | 1.5 | 1.5 | 1.5 | 1.5 | 1.35 | 1.35 | 1.35 | 1.35 | 1.5 | 1.35 |
| | lauric acid*10 | 2.1 | 2.1 | 2.1 | 2.1 | 2.1 | 2.1 | 2.1 | 2.1 | 2.1 | 2.1 | 2.1 | 2.1 |
| | myristic acid*11 | 1 | 1 | 1 | 1 | 1 | 1 | 1 | 1 | 1 | 1 | 1 | 1 |
| | palmitic acid*12 | 0.25 | 0.25 | 0.25 | 0.25 | 0.25 | 0.25 | 0.25 | 0.25 | 0.25 | 0.25 | 0.25 | 0.25 |
| | lauryl hydroxy-sulfobetaine*13 | 0.6 | 0.6 | 0.6 | 0.6 | 0.6 | 0.6 | 0.6 | 0.6 | 0.6 | 0.6 | 0.6 | 0.6 |
| Polymer | acrylic polymer | 0.12 | 0.12 | 0.12 | 0.12 | 0.12 | 0.12 | 0.12 | 0.12 | 0.12 | 0.12 | 0.12 | 0.12 |
| | polyethylene glycol-150 | 4.3 | 4.3 | 4.3 | 4.3 | 4.3 | 4.3 | 4.3 | 4.3 | 4.3 | 4.3 | 4.3 | 4.3 |
| pH regulator | potassium hydroxide (48%) | 1.04 | 1.04 | 1.04 | 1.04 | 1.04 | 1.04 | 1.04 | 1.04 | 1.04 | 1.04 | 2.17 | 1.04 |
| | arginine | 0.7 | 0.7 | 0.7 | 0.7 | 0.7 | 0.7 | 0.7 | 0.7 | 0.7 | 0.7 | 0.7 | 0.7 |
| Chelating agent | disodium EDTA | 0.1 | 0.1 | 0.1 | 0.1 | 0.1 | 0.1 | 0.1 | 0.1 | 0.1 | 0.1 | 0.1 | 0.1 |
| | Water | balance | balance | balance | balance | balance | balance | balance | balance | balance | balance | balance | balance |

*1Trade name: PROPYLENE GLYCOL USP/EP, Manufacturer: The Dow Chemical Company, Active ingredient content: 100%
*2Tradename: 1,2-Hexanediol (reagent), Manufacturer: Sigma-Aldrich Corporation, Active ingredient content: 100%
*3 Trade name: SY-DP9, Manufacturer: Sakamoto Yakuhin Kogyo Co., Ltd., Active ingredient content: 100%
*4 Trade name: diethylene glycol monobutyl ether (reagent), manufacturer: Sinopharm Chemical Reagent Co., Ltd., Active ingredient content: 100%
*5Trade name: NEOLONE PH 100, Manufacturer: The Dow Chemical Company, Active ingredient content: 100%
*6Trade name: POLYGLYCOL P-425, Manufacturer: The Dow Chemical Company, Active ingredient content: 100%
*7Trade name: GLYCERIN A (COSMETIC GRADE), Manufacturer: Kao Corporation, Active ingredient content: 100%
*8Trade name: PENETOL GE-EH, Manufacturer: Kao Corporation, Active ingredient content: 90%
*9Trade name: Akypo RLM-45CA, Manufacturer: Kao Corporation, Active ingredient content: 100%
*10Trade name: PALMAC 98-12, Manufacturer: IOI Acidchem Sdn. Bhd., Active ingredient content: 100%
*11Trade name: PALMAC 98-14, Manufacturer: IOI Acidchem Sdn. Bhd., Active ingredient content: 100%
*12Trade name: PALMAC 98-16, Manufacturer: IOI Acidchem Sdn. Bhd., Active ingredient content: 100%
*13Trade name: Amphitol 20HD, Manufacturer: Kao Corporation, Active ingredient content: 30%

TABLE 2

| | | | Example 1 | Comparative Example 1 | Example 2 | Example 3 | Example 4 | Example 5 | Example 6 |
|---|---|---|---|---|---|---|---|---|---|
| Liquid composition | | | A | A | B | C | D | E | F |
| Porous body | inner | first porous body | PET (200#) | Nylon (200#) | PET (200#) | PET (200#) | PET (200#) | PET (200#) | PET (200#) |
| | | second porous body | PET (300#) | Nylon (300#) | PET (300#) | PET (300#) | PET (300#) | PET (300#) | PET (300#) |
| | tip porous body | | PET (200#) | Nylon (200#) | PET (200#) | PET (200#) | PET (200#) | PET (200#) | PET (200#) |
| Volume ratio (air/composition) | | | 20 | 20 | 20 | 20 | 20 | 20 | 20 |
| Evaluation | clogging | short-term | 3 | 2 | 5 | 3 | 5 | 5 | 4 |
| | | long-term | 3 | 2 | 5 | 3 | 5 | 5 | 3 |
| | foam quality | | 3 | 3 | 6 | 6 | 6 | 6 | 3 |

| | | | Example 7 | Example 8 | Example 9 | Example 10 | Example 11 | Example 12 |
|---|---|---|---|---|---|---|---|---|
| Liquid composition | | | G | H | I | J | K | L |
| Porous body | inner | first porous body | PET (200#) | PET (200#) | PET (200#) | PET (200#) | PET (200#) | PET (200#) |
| | | second porous body | PET (300#) | PET (300#) | PET (300#) | PET (300#) | PET (300#) | PET (300#) |
| | tip porous body | | PET (200#) | PET (200#) | PET (200#) | PET (200#) | PET (200#) | PET (200#) |
| Volume ratio (air/composition) | | | 20 | 20 | 20 | 20 | 20 | 20 |
| Evaluation | clogging | short-term | 3 | 4 | 5 | 5 | 3 | 5 |
| | | long-term | 3 | 4 | 5 | 5 | 3 | 5 |
| | foam quality | | 6 | 6 | 6 | 3 | 6 | 6 |

TABLE 3

| | | | Example 13 | Example 14 | Example 15 | Example 16 |
|---|---|---|---|---|---|---|
| Liquid composition | | | D | D | D | D |
| Porous body | inner | first porous body | nylon (200#) | nylon (200#) | nylon (200#) | nylon (200#) |
| | | second porous body | nylon (300#) | nylon (300#) | nylon (300#) | nylon (300#) |
| | tip porous body | | PET (200#) | PET (100#) | PET (300#) | PET (350#) |
| Volume ratio (air/composition) | | | 20 | 20 | 20 | 20 |
| Evaluation | clogging | short-term | 5 | 5 | 5 | 5 |
| | | long-term | 5 | 5 | 5 | 5 |
| | foam quality | | 6 | 6 | 6 | 6 |

TABLE 4

| | | | Example 17 |
|---|---|---|---|
| Liquid composition | | | D |
| Porous body | inner | first porous body | nylon (200#) |
| | | second porous body | nylon (300#) |
| | tip porous body | | PET (200#) |
| Volume ratio (air/composition) | | | 15 |
| Evaluation | clogging | short-term | 5 |
| | | long-term | 5 |
| | foam quality | | 6 |

From Tables 2 to 4 above, it can be seen that by arranging the porous body composed of PET in the vicinity of the discharge port of the foam discharge container, compared with the case of arranging the porous body composed of nylon in the vicinity of the discharge port of the foam discharge container, the fine and uniform foam can be maintained while suppressing pores clogging of the porous body in the vicinity of the discharge port.

Examples 18 to 28

First, the foam discharge container 1 shown in FIGS. 4 and 7 was prepared. As shown in Tables 6 to 10, each porous body in the foam discharge container 1 and the arc-shaped curve corner defining the connection flow path that communicates with the discharge port of the foam discharge device and communicates with the pump core flow path were changed, respectively.

Next, each liquid composition was prepared according to the combination and compound ratio shown in Table 5. Then, the foam discharge containers of Examples 18 to 28 and Comparative Example 2 were produced by filling the foam discharge container with each of the obtained liquid compositions. In addition, the numerical value of each component in the table is a mass % with respect to the total mass of a liquid composition, and is a value as an active ingredient.

The following performance evaluations were performed using the foam discharge containers obtained in the Examples and Comparative Examples.

<Evaluation of Foam Quality>

By pressing the foam discharge containers of Examples 18 to 28 and Comparative Example 2 three times, the foam of the liquid composition was discharged from the discharge port of the foam discharge container, and the state of the foam was observed visually. Then, the foam quality was evaluated based on the following evaluation criteria, and the obtained results are shown in Tables 6 to 10 below.

6: The foam is very dense and rich

5: The foam is dense and rich

4: The foam is slightly coarser

3: The foam is slightly coarser, with a small amount of relatively larger bubbles 2: The foam is slightly coarser, with many relatively large bubbles 1: The foam is coarser with many large bubbles <Evaluation of Clogging>

Each foam discharge container was left still in a constant temperature room set at 40° C., the operation of pressing to discharge the foam was performed once a day, and the evaluation result of short-term clogging property was obtained by evaluating the presence or absence of clogging at the 90th time of pressing to discharge the foam based on the following evaluation criteria and the obtained results are shown in Tables 6 to 10 below.

Each foam discharge container was left still in a constant temperature room set at 40° C., the operation of pressing to discharge the foam was performed once a week, and the evaluation result of long-term clogging property was obtained by evaluating the presence or absence of clogging at the 12th time of pressing to discharge the foam based on the following evaluation criteria and the obtained results are shown in Tables 6 to 10 below.

5: The pump is pressed smoothly, and the feeling of pressing down does not change (there is no clogging at all)

4: The pump is pressed smoothly, and the feeling of pressing down is slightly heavier (it is slightly clogged)

3: The pump is pressed slightly unsmooth, and the feeling of pressing down is heavier (the clogging is relatively light)

2: The pump does not feel smooth to press, and the feeling of pressing down is obviously heavier (the clogging is more obvious)

1: The pump does not feel smooth when pressed, and the feeling of pressing down is obviously heavier (it is obviously clogged)

<Evaluation of Pressing Force>

Each foam discharge container was left still in a constant temperature room set at 25° C., and was pressed at a speed of 500 mm/min with a push-pull gauge (SF-100, Aipu Measuring Instrument Co., Ltd.), and the pressing stroke was 15 mm. The specific value of the pressing force (unit: kgf) was obtained by reading the value on the push-pull force meter, and the obtained results are shown in the following Tables 6 to 10. The evaluation standard of pressing force is 3.5 kgf, and the improvement effect is achieved if it is smaller than 3.5 kgf.

TABLE 5

| | Name | Liquid composition O |
|---|---|---|
| Component (A) | ethylhexyl glyceryl ether*8 (IOB = 0.55) | 0.13 |
| | phenoxyethanol*5 (IOB = 0.8) | 0.2 |
| | PPG-9 diglyceryl ether*3 (IOB = 0.9) | |
| | ethanol*14 (IOB = 2.5) | |
| | propylene glycol*1 (IOB = 3.3) | 7 |
| | glycerine*7 (IOB = 5.0) | 4 |

TABLE 5-continued

| | Name | Liquid composition O |
|---|---|---|
| Surfactant | laureth-6 carboxylic acid*[9] | 1.5 |
| | lauric acid*[10] | 2.1 |
| | myristic acid*[11] | 1 |
| | palmitic acid*[12] | 0.25 |
| | lauryl hydroxysulfobetaine*[13] | 0.6 |
| Polymer | acrylic polymer | 0.12 |
| | polyethylene glycol-150 | 4.3 |
| pH regulator | potassium hydroxide (48%) | 1.04 |
| | arginine | 0.7 |
| Chelating agent | Disodium EDTA | 0.1 |
| | Water | balance |

*[14]Trade name: ETHANOL (95%), Manufacturer: Taicang Xintai, Active ingredient content: 95%

TABLE 6

| | Comparative Example 2 | Example 18 | Example 19 | Example 22 |
|---|---|---|---|---|
| Formulation | O | O | O | O |
| Inner porous body1 | nylon(200#) | nylon(200#) | nylon(200#) | nylon(200#) |
| Inner porous body2 | nylon(300#) | nylon(300#) | nylon(300#) | nylon(300#) |
| Tip porous body | none | none | none | nylon(200#) |
| corner | right angle | curve corner R1 (5 mm) R2(16 mm) | curve corner R1 (1 mm) R2(5 mm) | curve corner R1 (1 mm) R2(5 mm) |
| Volume ratio | 20 | 20 | 20 | 20 |
| Short-term clogging | 5 | 5 | 5 | 4 |
| Long-term clogging | 5 | 5 | 5 | 4 |
| Foam quality | 5 | 5 | 5 | 6 |
| Pressing force | 3.55 | 2.87 | 2. 98 | 3.48 |

As can be seen from Table 6 above, the pressing force can be effectively reduced by making the corner defining the connection flow path which communicates with the discharge port of the foam discharge device and communicates with the pump core flow path as a curve corner rather than a right angle.

TABLE 7

| | Comparative Example 2 | Example 20 | Example 21 |
|---|---|---|---|
| Formulation | O | O | O |
| Inner porous body1 | nylon(200#) | nylon(200#) | PET(200#) |
| Inner porous body2 | nylon(300#) | nylon(300#) | PET(300#) |
| Tip porous body | none | PET(200#) | PET(200#) |
| corner | right angle | curve corner R1(5 mm) R2(16 mm) | curve corner R1 (5 mm) R2(16 mm) |
| Volume ratio | 20 | 20 | 20 |
| Short-term clogging | 5 | 4 | 5 |
| Long-term clogging | 5 | 4 | 5 |
| Foam quality | 5 | 6 | 6 |
| Pressing force | 3.55 | 3.33 | 3.35 |

As can be seen from Table 7 above, the corner defining the connection flow path that communicates with the discharge port of the foam discharge device and communicates with the pump core flow path is setted as a curve corner, and the porous body made of PET is arranged in the vicinity of the discharge port of the foam discharge container, pores clogging of the porous body in the vicinity of the discharge port can be suppressed, and the pressing force can be effectively reduced while maintaining fine and uniform foam quality.

TABLE 8

| | Example 21 | Example 23 | Example 24 |
|---|---|---|---|
| Formulation | O | O | O |
| Inner porous bodyl | PET(200#) | PET(200#) | PET(200#) |
| Inner porous body 2 | PET(300#) | PET(300#) | PET(300#) |
| Tip porous body | PET(200#) | PET(200#) | PET(200#) |
| corner | curve corner R1 (5 mm) R2 (16 mm) | curve corner R1 (1 mm) R2 (5 mm) | curve corner R1 (3 mm) R2 (10 mm) |
| Volume ratio | 20 | 20 | 20 |
| Short-term clogging | 5 | 5 | 5 |
| Long-term clogging | 5 | 5 | 5 |
| Foam quality | 6 | 6 | 6 |
| Pressing force | 3.35 | 3.48 | 3.39 |

From Table 8 above, it can be seen that the pressing force can be reduced more effectively by setting the arc radius of the inside curve corner to be 1 to 5 mm and the arc radius of the outside curve corner to be 5 to 16 mm.

TABLE 9

| | Example 21 | Example 26 | Example 27 | Example 28 |
|---|---|---|---|---|
| Formulation | O | O | O | O |
| Inner porous bodyl | PET(200#) | PET(200#) | PET(200#) | PET(200#) |
| Inner porous body2 | PET(300#) | PET(300#) | PET(300#) | PET(300#) |
| Tip porous body | PET(200#) | PET(100#) | PET(300#) | PET(350#) |
| corner | curve corner R1 (5 mm) R2 (16 mm) | curve corner R1(5 mm) R2(16 mm) | curve corner R1(5 mm) R2(16 mm) | curve corner R1(5 mm) R2(16 mm) |
| Volume ratio | 20 | 20 | 20 | 20 |
| Short-term clogging | 5 | 5 | 5 | 5 |
| Long-term clogging | 5 | 5 | 5 | 5 |
| Foam quality | 6 | 6 | 6 | 6 |
| Pressing force | 3.35 | 3.27 | 3.43 | 3.48 |

As can be seen from Table 9 above, by setting the mesh number of the tip side porous body to 100 to 350 mesh, it is possible to suppress pores clogging of the porous body in the vicinity of the discharge port while maintaining a fine and uniform foam quality.

TABLE 10

| | Example 25 |
|---|---|
| Formulation | O |
| Inner porous body1 | PET(200#) |
| Inner porous body2 | PET(300#) |
| Tip porous body | PET(200#) |
| corner | curve corner R1 (5 mm) R2 (16 mm) |
| Volume ratio | 15 |
| Short-term clogging | 5 |
| Long-term clogging | 5 |
| Foam quality | 4 |
| Pressing force | 3.20 |

As can be seen from Table 10 above, by setting the volume ratio of the air/liquid composition to 15/1, pores clogging of the porous body in the vicinity of the discharge port can be suppressed while maintaining a fine and uniform foam quality.

The invention claimed is:

1. A foam discharge container, comprising:

a container main body that is accommodating a liquid composition; and a foam discharge device which mixes the liquid composition with air and discharges it in a foam form, wherein the foam discharge device has a plurality of porous bodies through which the liquid composition passes when the liquid composition is discharged, wherein the plurality of porous bodies comprise a tip side porous body arranged in a vicinity of a discharge port of the foam discharge device, wherein the tip side porous body is composed of polyethylene terephthalate, and wherein the liquid composition contains alcohols with an IOB value of 0.55-5.0 as a component (A).

2. The foam discharge container according to claim 1, wherein a mesh number of the tip side porous body is 100 to 350 mesh.

3. The foam discharge container according to claim 1, wherein the air and the liquid composition are discharged from the discharge port at a volume ratio of air/liquid composition of 15/1 or more and 38/1 or less.

4. The foam discharge container according to claim 1, wherein the foam discharge device comprises an arc-shaped curve corner defining a connection flow path that communicates with the discharge port and communicates with a pump core flow path, and the curve corner includes an inside curve corner and an outside curve corner.

5. The foam discharge container according to claim 4, wherein a tangent of a starting point and a tangent of an ending point of the curve corner intersect in a vertical manner.

6. The foam discharge container according to claim 4, wherein an arc radius of the inside curve corner is 1-5 mm, and an arc radius of the outside curve corner is 5-16 mm.

7. The foam discharge container according to claim 1, wherein the component (A) is one or more selected from the group consisting of 1,2 hexanediol, diethylene glycol monobutyl ether, and phenoxyethanol.

8. The foam discharge container according to claim 1, wherein the component (A) is contained in 2-50 mass % with respect to 100 mass % of the liquid composition.

9. The foam discharge container according to claim 1, wherein the liquid composition further contains a foamable surfactant in an amount of 0.5 to 20 mass % with respect to 100 mass % of the liquid composition.

10. The foam discharge container according to claim 1, wherein the liquid composition is a skin cleanser composition.

11. A foam discharge container, comprising:

a container main body for accommodating a liquid composition; and a foam discharge device for mixing the liquid composition with air and discharging it in a foam form, wherein the foam discharge device comprises an arc-shaped curve corner defining a connection flow path that communicates with a discharge port of the foam discharge device and communicates with a pump core flow path, wherein the curve corner includes an inside curve corner and an outside curve corner, wherein an arc radius of the inside curve corner is 1-5 mm, and wherein an arc radius of the outside curve corner is 5-16 mm.

12. The foam discharge container according to claim 11, wherein a tangent of a starting point and a tangent of an ending point of the curve corner intersect in a vertical manner.

13. The foam discharge container according to claim 11, wherein the air and the liquid composition are discharged from the discharge port at a volume ratio of air/liquid composition of 15/1 or more and 38/1 or less.

14. The foam discharge container according to claim 11 further comprising a tip side porous body in a vicinity of the discharge port of the foam discharge device.

15. The foam discharge container according to claim 14, wherein the tip side porous body is composed of polyethylene terephthalate.

16. The foam discharge container according to claim 14, wherein a mesh number of the tip side porous body is 100 to 350 mesh.

17. The foam discharge container according to claim 11, wherein the liquid composition contains alcohols with an IOB value of 0.55-5.0 as a component (A).

18. The foam discharge container of claim 17, wherein the component (A) is phenoxyethanol.

19. The foam discharge container of claim 17, wherein the component (A) is contained in 2-50 mass % with respect to 100 mass % of the liquid composition.

20. The foam discharge container according to claim 17, wherein the liquid composition further contains a foamable surfactant in an amount of 0.5 to 20 mass % with respect to 100 mass % of the liquid composition.

21. The foam discharge container according to claim 17, wherein the liquid composition is a skin cleanser composition.

* * * * *